Oct. 5, 1948.   R. S. WALLACH   2,450,461
DIAPHRAGM PUNCTURING VALVE STRUCTURE
Filed Oct. 4, 1945
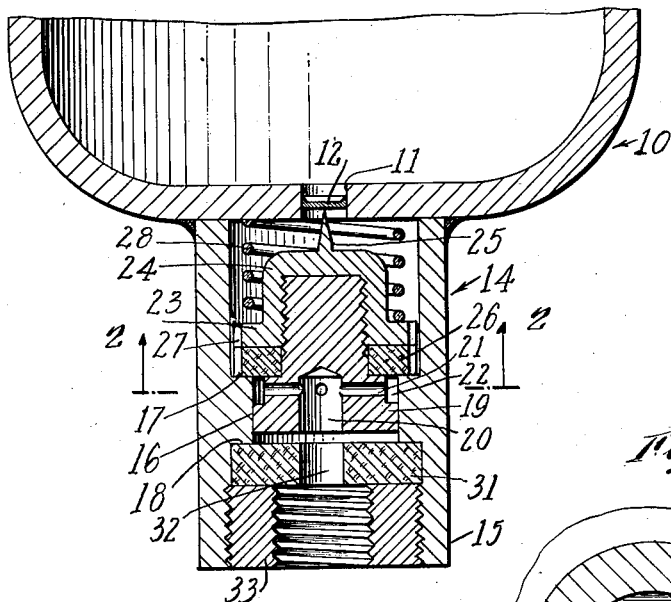
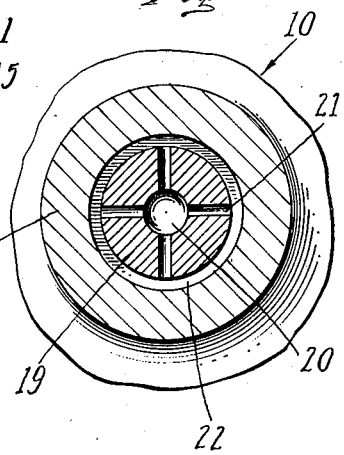
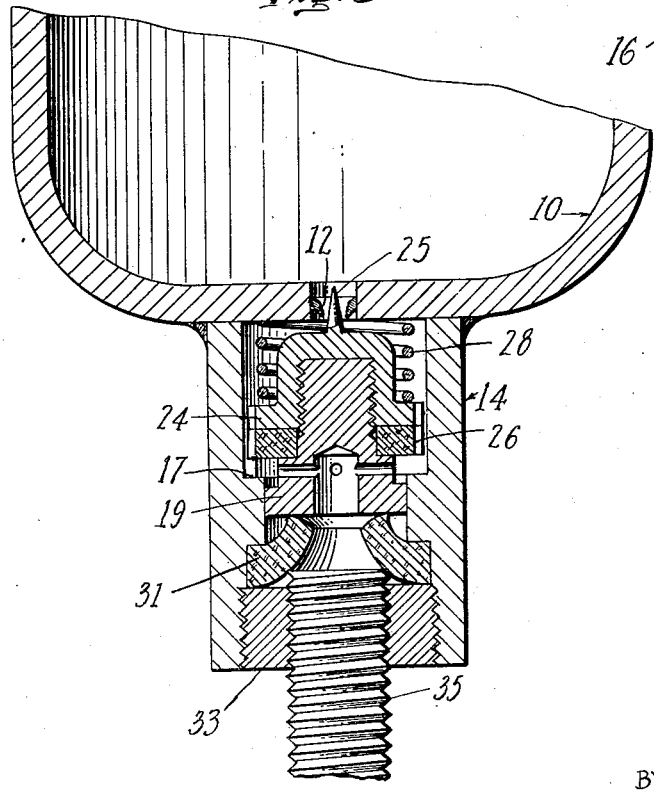
INVENTOR
Robert S. Wallach
BY Duell, Kane v Smoot
ATTORNEYS Patented Oct. 5, 1948

2,450,461

UNITED STATES PATENT OFFICE 2,450,461

DIAPHRAGM PUNCTURING VALVE STRUCTURE

Robert S. Wallach, Madison, N. J., assignor to Associated Development and Research Corporation, New York, N. Y., a corporation of New York Application October 4, 1945, Serial No. 620,357

4 Claims. (Cl. 222—7)

This invention relates to an improved container for gas under high pressure, and particularly to an improved valve structure whereby the gas may be released from the container as desired.

It is a principal object of the invention to provide a gas container having a valve structure whereby the gas may be released from the container by the simple act of screwing into, or inserting into, the valve structure a tubular conduit forming the inflow connection to the device or chamber which is to receive the gas discharging from the capsule.

It is another object of the invention to provide a release valve for a gas container in which loss of gas through leakage about the said tubular conduit is eliminated.

It is yet another object of the invention to provide a valve structure of the self-closing type which is substantially trouble-free and will be certain in its operation even after long periods of non-use.

In the accompanying drawings:

Fig. 1 is an elevation, in vertical section, of the lower portion of a gas container provided with a valve embodying the present invention;

Fig. 2 is a plan section taken on lines 2—2 of Fig. 1; and

Fig. 3 is a view similar to that of Fig. 1, but showing the valve in open position.

Referring to the drawings for a more complete description of the invention, a container or "capsule" 10 is presumed to have a fluid content such as a gaseous fluid under high pressure. A relatively small diameter outlet 11 of the container is sealed by a preferably metallic membrane 12 which may be soldered or otherwise secured within the outlet 11 following the charging of the container with the fluid content.

Affixed to the end of the container 10, and preferably concentric with the passage 11 therethrough, is a valve structure 14, having a preferably tubular housing 15 formed intermediate its ends with a reduced-diameter cylindrical sleeve 16 affording an upper seat portion 17 and a lower seat 18. The length of the sleeve 16 is such as to provide sleeve means for guiding a valve member 19 slidably positioned therein. As indicated the valve means 19 has an axial passage 20 communicating with which are any plurality of branching passages 21. As clearly appears in Fig. 1, the said branching passages open into an annular space 22 between a reduced diameter portion of the valve member 19 and the inner wall of the sleeve 16.

The valve member terminates in a threaded head portion 23 which carries a complementary threaded cap 24 which has a pointed tip 25, so arranged with respect to the seal 12 that upon upward movement of the valve structure, the tip 25 will puncture the seal 12 to permit fluid flow into the valve housing.

Confined between the cap and a shoulder of the valve member, and normally resting upon the valve seat 17, is a valve disc 26 of any suitable material. Material consisting of a mixture of ground cork and neoprene, and sold under the trade name "Corprene" has been found to be well suited for the purpose.

As appears in Fig. 1, the lower rim portion of the cap 24, as well as the periphery of the disc 26, is fluted to provide channels 27 along which the discharging gas may flow. It is apparent that the flutings also provide guides which accurately position the cap and disc within the valve housing. If desired, the flutings may of course be eliminated from the valve disc.

A spring 28 disposed about the cap 24 and bearing against the lower flange portion thereof serves normally to urge the entire valve structure downwardly into seating relationship, and holds the piercing tool 25 out of contact with the seal 12.

As shown, the outer or lower end of the valve housing 15 is internally threaded, and there is positioned within the housing, to rest upon the lower seat 18 of the section 16, a distortable sealing disc 31 having a central opening 32 which is concentric with the passage 20 in the valve member 19. The said disc 31 may also be of "Corprene" and is held securely in position by means of the internally threaded sleeve 33. The sleeve may therefore screw-threadedly receive a male threaded tube or conduit forming the inlet to whatever is to be inflated or charged by the gas content of the capsule 10.

Although the invention has many other uses, it is particularly advantageous as a means for inflating pneumatic tires. As such, the capsule 10 will be of relatively small size, charged with $CO_2$ under high pressure. The threaded tube 35, shown in Fig. 3, represents the threaded stem of a tire-tube valve.

Fig. 3 illustrates the manner in which the valve stem or other conduit 35 is used as the means of opening the valve.

The valve housing 14 is screwed on to the end of the valve stem 35 until the end of the valve stem engages with the underside of the disc 31, it being apparent from Fig. 1 that the disc 31 extends substantially inwardly of the opening in sleeve 33, and has an area about its opening 32 which provides for adequate engagement of the tube or stem 35. Continued screwing of the valve housing 14 on to the stem will distort the disc 31 upwardly until it bears against the underside of the valve member 19, whereupon continued upward distortion of the disc 31 will lift the valve and its associated piercing member until the membrane 12 is pierced to permit the discharge of gas therethrough. Material such as "Corprene" has sufficient flexibility and structural strength to permit the disc 31 to accomplish the upward movement of the valve as aforesaid. The engagement of the bottom surface of the disc 31 with the stem 35, and the engagement of upper surface of the disc with the underside of the valve member 19 creates an effective seal which prevents any loss of the gaseous fluid about the outer wall of the stem. Accordingly, the threaded engagement of the stem 35 with the sleeve 33 can be relatively loose without danger of leakage of the gas along the inner wall of sleeve 33. In fact, a smooth-walled tube 35, so long as it fits snugly within the sleeve 33, can be used to open the valve with very little leakage around the tube.

Upon removal of the capsule from the stem 35, gas pressure against the cap 24, plus the spring 28, reseats the valve to prevent further escape of gas. The downward movement of the valve restores the disc 31 substantially to its original status. The capsule may therefore be used intermittently until its charge is exhausted.

It will thus be seen that the valve structure herein described affords a simple, substantially leak-proof closure for a compressed-gas capsule, independent of valve handles, valve cocks or the like for controlling gas flow.

Although the invention has been described by making a fully detailed reference to a certain presently preferred embodiment, such detail of description is to be understood in an instructive rather than a limiting sense, many changes being possible within the scope of the claims hereto appended.

I claim:

1. In combination with a fluid-containing container having a frangible seal initially closing an outlet from said container: a valve comprising a tubular housing secured to said container about said outlet, a reduced-diameter concentric sleeve member formed within said housing intermediate the ends thereof and having valve seat means at an inner end, a valve member slidably disposed within said housing and guided for reciprocal movement by engagement with said sleeve member; valve disc means carried by said valve member and operatively associated with said valve seat means; cap means disposed upon said valve member and having a piercing tool disposed beneath said frangible seal and normally out of engagement therewith when the valve disc is seated upon said seat means; means for normally urging said valve member into seating relationship; flexible, annular sealing means disposed within said chamber beneath said valve member; and an internally threaded attachment coupling disposed within said housing beneath said flexible sealing means and having a diameter substantially greater than the diameter of the opening through said sealing means, whereby a tubular conduit screwed into said coupling will distort the sealing means upwardly against said valve member to urge the latter upwardly to lift the valve disc off of the seat and to cause said piercing tool to penetrate said frangible seal.

2. In combination with a fluid container having a discharge port normally closed by a frangible seal: a valve comprising a tubular housing affixed to said container about the discharge port thereof, means in said housing forming a valve seat, a valve member slidably disposed within said housing, valve disc means carried by said valve member for cooperation with said valve seat, means carried by said valve member for piercing said frangible seal upon movement of said valve member in the direction of said seal, said piercing means being out of engagement with said seal when the disc is in seated position; means for normally holding said disc in seated position; a female-threaded attachment coupling disposed at the end of said housing, and a flexible annular seal disposed intermediate the inner end of said coupling and said valve member and arranged to be engaged and distorted upwardly against said valve member by screwing a tubular conduit into said coupling, whereby the valve member may be moved into unseated and seal piercing position upon screwing said conduit into said coupling to a suitable extent.

3. A valve comprising a tubular housing having a concentric inwardly extending cylindrical sleeve provided intermediate the ends thereof, an end of said sleeve forming valve seating means; a valve member within said housing and guided for axial movement by engagement with said cylindrical sleeve and the wall of said housing above said sleeve, said valve member having flow passages communicating between the interior of said housing and the discharge end thereof; a valve disc carried by said valve member for cooperation with said valve seat; means for normally urging said valve member into seating relationship; an annular coupling member disposed within said housing at the outflow end thereof; and a flexible, annular disc secured within said housing between the inner end of said coupling in engagement with the lower end of said cylindrical sleeve and extending across the end wall of said coupling, said annular disc being immediately adjacent the lower end of said valve means and having an axial passage communicating with said valve passage, whereby upon distorting the annular disc in the direction of said valve member as by a tubular conduit inserted into said coupling member and engaging the surface of said disc the latter will press against the underside of said valve member to move it into unseated position while sealingly engaging the end of said tubular conduit.

4. In combination with a fluid container having a discharge port normally closed by a membrane seal: a valve comprising an internally cylindrical housing extending from said container about the discharge port thereof, wall means within said housing intermediate the ends thereof forming a valve seat, a valve member slidably disposed within said housing for axial movement therein, a valve disc carried by said valve member for cooperation with said valve seat, a pointed instrument supported upon said valve member for piercing said seal upon movement of said valve member in the direction thereof, said pointed instrument being out of engagement with said seal when the valve disc is in seated position; a bushing disposed within said housing at the discharge end thereof, and a flexible annular disc disposed between said bushing and said valve member, in close adjacency with said valve member, said disc being secured only about its periphery and thereby having an unsupported central portion to be engaged by and distorted upwardly against said valve member by inserting a conduit into said bushing, whereby the valve member will be moved into unseated and seal piercing position during continued inward movement of said conduit.

ROBERT S. WALLACH.

REFERENCES CITED

The following references are of record in the file of this patent:

UNITED STATES PATENTS

| Number | Name | Date |
|---|---|---|
| Re. 14,494 | Charroin | July 23, 1918 |
| 805,474 | Lavertine | Nov. 28, 1905 |
| 1,526,271 | Ewald | Feb. 10, 1925 |
| 1,781,854 | Mapes | Nov. 18, 1930 |